US008457134B2

(12) United States Patent
Munari et al.

(10) Patent No.: US 8,457,134 B2
(45) Date of Patent: Jun. 4, 2013

(54) METHOD FOR DYNAMIC ROUTING USING TUNNELING

(75) Inventors: Andrea Munari, Mogliano Veneto (IT);
Wolfgang Schott, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 12/234,808

(22) Filed: Sep. 22, 2008

(65) Prior Publication Data

US 2010/0074161 A1 Mar. 25, 2010

(51) Int. Cl.
*H04L 12/28* (2006.01)
*H04H 20/71* (2008.01)
*H04W 4/00* (2009.01)

(52) U.S. Cl.
USPC ........... 370/400; 370/312; 370/328; 370/338; 370/392

(58) Field of Classification Search
None
See application file for complete search history.

(56) References Cited

U.S. PATENT DOCUMENTS

| | | | |
|---|---|---|---|
| 6,304,556 B1 | 10/2001 | Haas | |
| 6,671,819 B1 | 12/2003 | Passman et al. | |
| 6,961,310 B2 | 11/2005 | Cain | |
| 2007/0110073 A1 | 5/2007 | Hirano | |
| 2008/0002640 A1* | 1/2008 | Westphal | 370/338 |
| 2009/0046712 A1* | 2/2009 | Nordmark et al. | 370/389 |
| 2009/0135824 A1* | 5/2009 | Liu | 370/392 |
| 2009/0238109 A1* | 9/2009 | Byard et al. | 370/328 |

OTHER PUBLICATIONS

Perkins et al., Ad-hoc On-Demand Distance Vector Routing, IEEE WMCSA, New Orleans, LA, US, Feb. 1999.
Coronel et al., Geographic Routing with Cooperative Relaying and Leapfrogging in Wireless Sensor Networks, IEEE GlobeCom, Washington DC, US, Nov. 26-30, 2007.
Johnson et al., DSR: The Dynamic Source Routing Protocol for Multi-Hop Wireless Ad Hoc Networks, Ad Hoc Networking. Addison-Wesley, 2001, ch. 6, pp. 139-172.
Biswas et al., Opportunistic Routing in Multi-Hop Wireless Networks, MIT Laboratory for Computer Science, pp. 1-6.
Zorzi et al., Geographic Random Forwarding (GeRaF) for Ad Hoc and Sensor Networks: Multihop Performance, IEEE Transactions on Mobile Computing, vol. 2, No. 4, pp. 337-348, 2003.
Mueller et al., Multipath Routing in Mobile Ad Hoc Networks: Issues and Challenges, Lecture Notes in Computer Science. Springer Berlin/Heidelberg, 2004, pp. 209-234.
Rao et al., Geographic Routing without Location Information, MobiCom 03, Sep. 14-19, 2003, San Diego, California, ACM, pp. 96-108.

* cited by examiner

*Primary Examiner* — Jutai Kao
(74) *Attorney, Agent, or Firm* — Daniel P. Morris; Ryan, Mason & Lewis, LLP

(57) ABSTRACT

Techniques for routing data from a source to a destination in a wireless network are provided. The techniques include broadcasting one or more messages in a network to identify a set of one or more nodes that can be used to forward data towards a destination, routing data from a source to the destination by way of a sequence of one or more data transmissions involving the one or more identified nodes, wherein each data transmission comprises a node that has data addressed to the destination to trigger a distributed procedure among the one or more identified nodes to select a relaying node, and sending the data to the selected relaying node until the destination is reached.

21 Claims, 13 Drawing Sheets

METHOD FOR DYNAMIC ROUTING USING TUNNELING

FIELD OF THE INVENTION

The present invention generally relates to information technology, and, more particularly, to routing mechanisms.

BACKGROUND OF THE INVENTION

Routing algorithms play a role of paramount importance in wireless ad hoc and sensor networks, as their efficiency can significantly affect the overall system performance. Such schemes are required each time a node has data to deliver to a destination that is too far to be reached by way of a single transmission, and their role is twofold. On one hand, the routing algorithms have to locate the desired node within the network and identify a path (that is, a sequence of neighboring terminals) that can be used to deliver packets to such a target. On the other hand, a routing procedure has to react whenever a given path is no longer available by providing an alternative source-destination connection (route recovery mechanism).

Existing routing algorithms include static and dynamic approaches. In the former case, the sink node is tracked by way of a route construction procedure whose outcome is a single path from the source to the destination. Once such a route has been identified, it is used to forward data. The source sends the data packet addressed to the destination to the first node in the discovered route. Such a node, then, forwards the received packet to the following node in the sequence, and so on, until the destination receives the information. Static routing does not require any geographic information on terminal locations, and thus it is suitable for all the applications where node positions cannot be inferred. However, this approach triggers a route recovery procedure as soon as one of the nodes along the built forwarding sequence is no longer available. This may happen, for example, because of harsh channel conditions, mobility and/or node failures. In ad hoc networks, for instance, terminals that move around represent a common situation. In these conditions, whenever a node moves out of the coverage range of its predecessor in a routing path, the solution offered by static routing does not work anymore.

Another scenario that may severely suffer if a single path from the source to the destination is provided is represented by wireless sensor networks (WSNs). Here, the terminals typically have a limited life, constrained by the duration of their battery. Due to this, sensor nodes usually have a very short duty cycle in order to save energy, and may be unavailable to communications for most of the time unless a specific scheduling procedure is provided (which is a non-trivial task in a fully distributed network). In such a setting, terminals may easily invalidate a previously tracked route because of energy depletion or sleep-mode induced inactivity. Whenever a tracked route fails, static routing triggers a procedure to identify a new path to reach the destination. These procedures significantly increase costs in terms of energy consumption, and negatively affect the overall quality of service (QoS), for instance in terms of latency. One of the best known existing static routing algorithms is Ad hoc On-demand Distance Vector routing (AODV) that handles both the route construction and the route recovery procedures by flooding control messages through the network.

A completely different approach is followed by dynamic routing algorithms, such as Geographic Random Forwarding (GeRaF), which have been proposed for networks where geographic information is available at terminals (for example, by way of a global positioning system (GPS)). In such an algorithm, all of the nodes are aware of the location of the destination, and a route construction procedure to track this node is not needed. A node that has data to forward simply broadcasts a request packet to its neighbors. The receivers of this message infer the advancement that they offer towards the sink by exploiting topological knowledge and contend among each other to elect the next hop closest to the target. Once the next hop has been chosen, data are sent to this node, and the procedure is iterated until the destination is eventually reached. As opposed to algorithms like AODV, the dynamic approach does not divide the routing algorithm in path construction and data forwarding, but rather chooses, step by step, a next hop and immediately sends information without knowing in advance the complete route that will be followed to eventually reach the destination. Therefore, even if a node that may be used for forwarding data is not available, another terminal can take its place in a seamless way. This capability of dynamic strategies of not relying on a single path when routing data from a source to a destination strongly enhances the robustness against impairments that typically affect static routing. However, the need for geographic information limits the applicability of such solutions, due to the cost and complexity of location systems.

SUMMARY OF THE INVENTION

Principles of the present invention provide techniques for dynamic routing using tunneling. An exemplary method (which may be computer-implemented) for routing data from a source to a destination in a wireless network, according to one aspect of the invention, can include steps of broadcasting one or more messages in a network to identify a set of one or more nodes that can be used to forward data towards a destination, routing data from a source to the destination by way of a sequence of one or more data transmissions involving the one or more identified nodes, wherein each data transmission comprises a node that has data addressed to the destination to trigger a distributed procedure among the one or more identified nodes to select a relaying node, and sending the data to the selected relaying node until the destination is reached.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention include dynamic routing using tunneling. One or more embodiments of the present invention include a routing procedure, referred to herein as tunnel routing (TR). Tunnel routing uses a route construction procedure to identify a set of potential forwarders (that is, a tunnel) rather than a single path from a source to a destination, providing the possibility of using dynamic routing techniques when forwarding data even if topological knowledge is not available. Therefore, one or more embodiments of the invention provide robustness against impairments that typically affect static routing (for example, robustness against node mobility, node depletion and unavailability), without requiring any location system (for example, GPS) to gather geographic information.

One or more embodiments of the invention are suitable for many applications. Tunnel routing is particularly advantageous, for example, for scenarios where nodes are mobile and for wireless sensor networks, thanks to its capability of dealing with terminal depletions and unavailability due to sleep-awake cycles. Moreover, the possibility of performing dynamic routing without location management makes the techniques described herein easier and cheaper to implement with respect to other routing schemes such as, for example, GeRaF.

Abbreviations used herein to describe one or more embodiments of the invention can include routing table (RT), route request packet (RREQ), route reply packet (RREP), forward route construction procedure (FRC), backward route construction procedure (BRC), forward route flag (FRF), backward route flag (BRF), request to send packet (RTS), clear to send packet (CTS), source node (S) (that is, the originator of the data packet), destination node (D) (that is, the final addressee of the data packet), and intermediate node (X).

Figure 1:
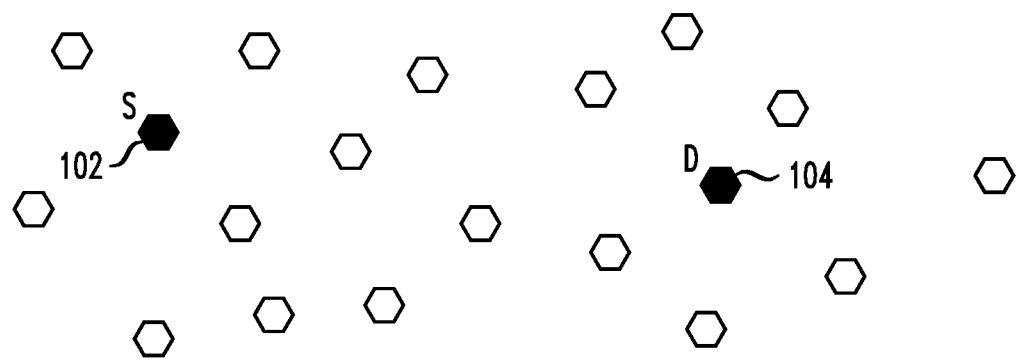
FIG. 1 is a diagram illustrating a reference topology for tunnel routing, according to an embodiment of the present invention.

The basic concept of the proposed scheme is illustrated by way of FIG. 1 and FIG. 2 and briefly described in the following. FIG. 1 is a diagram illustrating a reference topology for tunnel routing, according to an embodiment of the present invention. By way of illustration, FIG. 1 depicts a source node 102 denoted by S, and a destination 104 denoted by D. If no geographic information is available at nodes, a route discovery algorithm has to be initiated each time S has data to deliver to D but a path thereto is not already known. The task is usually accomplished in static routing by broadcasting RREQ packets in the network until the desired node is reached. As a consequence of the flooding nature of broadcast algorithms, many terminals receive route construction frames and take part in the overall procedure, but only a small fraction is chosen to determine the actual path.

Tunnel routing, on the contrary, exploits the destination tracking mechanism to enroll a larger number of nodes, identifying a set of potential forwarders rather than a single (static) route. When a route construction procedure is needed, TR follows a customary static approach, letting the source node S send out a RREQ message. Terminals that receive the message switch on a forward route flag (FRF) and rebroadcast the frame. Once the destination is reached, a backward route construction (BRC) is initiated, and D transmits a RREP packet to all of its neighbors.

Nodes that decode this message but have not received the RREQ (that is, FRF is off) simply ignore the procedure, as they are likely not to offer convergence towards the source. On the contrary, terminals that have an active FRF switch on a backward route flag (BRF) and rebroadcast the RREP.

Figure 2:
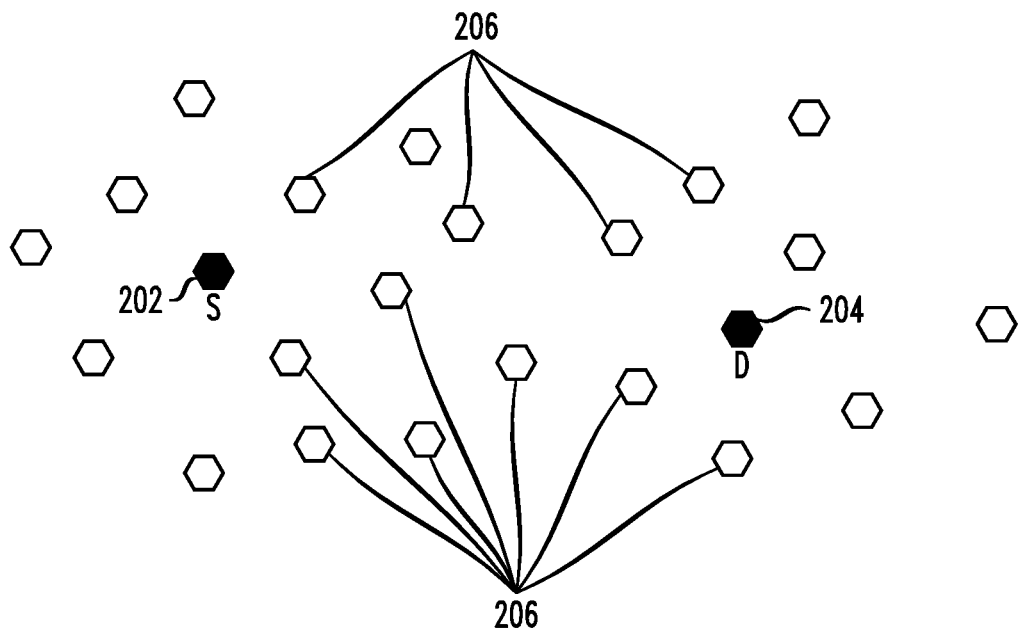
FIG. 2 is a diagram illustrating a potential scenario in a network after a route construction procedure from S to D has been accomplished, according to an embodiment of the present invention.

Such a forward route construction procedure can be seen in FIG. 2. FIG. 2 is a diagram illustrating a potential scenario in a network after a route construction procedure from S to D has been accomplished, according to an embodiment of the present invention. By way of illustration, FIG. 2 depicts a source node 202 denoted by S, a destination 204 denoted by D, and active nodes 206. Nodes 206 that are active (that is, they have both forward route flag and backward route flag on) can actively participate in data forwarding.

The outcome of such an exemplary route construction algorithm is a set of active nodes that form a "tunnel" from S to D. Therefore, TR does not identify a specific path to the destination as a static approach would, but rather, TR identifies a group of nodes that are aware of being potential forwarders for a given packets flow. As soon as the source receives a RREP coming from D, the actual data transmission can take place resembling dynamic routing schemes, as described herein in connection with data forwarding.

In the following, more details on the proposed routing algorithm are given. In the below section describing a "Routing Table," the structure of the routing table used by TR is described. In the below section describing "Forward Route Construction," the procedures of the forward route construction phase for TR are described. The below section describing "Backward Route Construction" gives more details on the procedures of the backward route construction phase for TR. Also, the section describing "Data Forwarding" provides details on the how data are routed from the source to the destination once forward route construction and backward route construction phases have been accomplished. The below section describing "Route Recovery" considers routing recovery procedures for TR. Throughout the description herein, we will refer to the topology depicted in FIG. 1, and we will assume that node S wants to establish a connection to D.

Routing Table.

Each node in the network holds an internal routing table (RT) where it stores information on known paths and routes under discovery. The RT can be thought of as an array whose entries are in the form presented in Table I.

TABLE I

| $src_{addr}$ | $dest_{addr}$ | $seq_{id}$ | $n_{hopS}$ | $n_{hopD}$ | Time |
| --- | --- | --- | --- | --- | --- |

The fields of each item have the following meanings. $src_{addr}$ indicates the ID of the initiator of the route discovery procedure. $dest_{addr}$ indicates the ID of the target of the route discovery procedure. $seq_{id}$ indicates a unique number that identifies the route discovery procedure that is set by the initiator of the procedure. $n_{hopS}$ indicates a distance in terms of hops of the node from the initiator of the route discovery procedure. $n_{hopD}$ a distance in terms of hops of the node from the initiator of the route discovery target. "Time" indicates a time stamp set when the node receives the first RREP packet for the specific route construction procedure.

Forward Route Construction.

As described herein, one or more embodiments of the invention include a forward route construction procedure (as additionally described in connection with FIG. 10 and FIG. 11 below). When a packet from the higher layers is received, node S checks its routing table to determine if a valid route to the destination is already known. This is the case if the RT contains an entry that satisfies two conditions: $dest_{addr}$=D and Time≦$T_{max}$. The second requirement is meant to avoid using routes that are too old and therefore are not considered reliable (for example, because the destination is likely to have moved significantly). $T_{max}$ is a network parameter and can be set according to different factors (for example, the average estimated node mobility).

If such conditions are met, the data delivery procedure is initiated. Otherwise, the destination has to be tracked and a forward route construction procedure starts. In such a case, the source node transmits a Route REQuest (RREQ) packet (as seen in Table II below) whose fields are set as follows:

$src_{addr}$: S;

$dest_{addr}$: D;

$seq_{id}$: a) if no entry with destination D was found in the RT, $seq_{id}$=1; b) if an entry was with destination D and $seq_{id}$=seq_old was found, $seq_{id}$=seq_old+1;

$n_{hopS}$=0.

TABLE II

STRUCTURE OF A RREQ PACKET

| $src_{addr}$ | $dest_{addr}$ | $seq_{id}$ | $n_{hopS}$ |
| --- | --- | --- | --- |

Any terminal that receives a RREQ frame compares the $n_{hopS}$ value contained in it with a threshold value $n_{hopmax}$. If $n_{hopS} \geq n_{hopmax}$, the packet is discarded. If, instead, $n_{hopS} < n_{hopmax}$, the node checks its RT. If an entry for the couple (S,D) with $seq_{id}$ lower than or equal to the one contained in the RREQ is present, the frame is deleted. Otherwise, the node updates the RT (by creating a new entry or by updating the existing one for the (S,D) pair if already existing) as follows:

$src_{addr}$: S;

$dest_{addr}$: D;

$seq_{id}$: $seq_{id}$ contained in the RREQ frame;

$n_{hopS}$: $n_{hopS}$ contained in the RREQ frame+1;

$n_{hopD}$: 1;

Time: 0.

Any terminal that has the $n_{hopS}$ field set for (S,D) in its RT is said to have the forward route flag (FRF) switched "on" for that couple. Once the register is refreshed, the node creates a new RREQ packet by copying the received one and by increasing the $n_{hopS}$ field by one. The frame is then transmitted, exploiting the underlying medium access strategy. Nodes that receive a RREQ packet transmitted by a node different from S check their RT as described above and, if appropriate, update their register.

Figure 3:
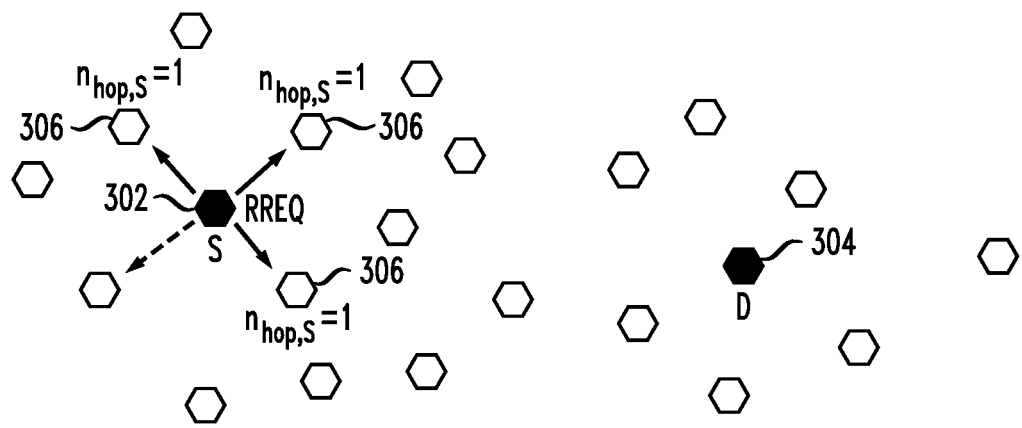
FIG. 3 is a diagram illustrating forward route construction, according to an embodiment of the present invention.

The described procedure according to an embodiment of the present invention is illustrated in FIG. 3. FIG. 3 depicts a source node 302 denoted by S, a destination 304 denoted by D, and nodes in the proximity of S 306. Nodes 306 that decode a RREQ packet sent by S (continuous line) switch the forward route flag for the S-D communication and update their routing table. Notice that some neighbors of S may not decode the packet (dashed line) because of their unavailability or because of harsh channel conditions. These terminals do not participate in the route construction.

Figure 4:
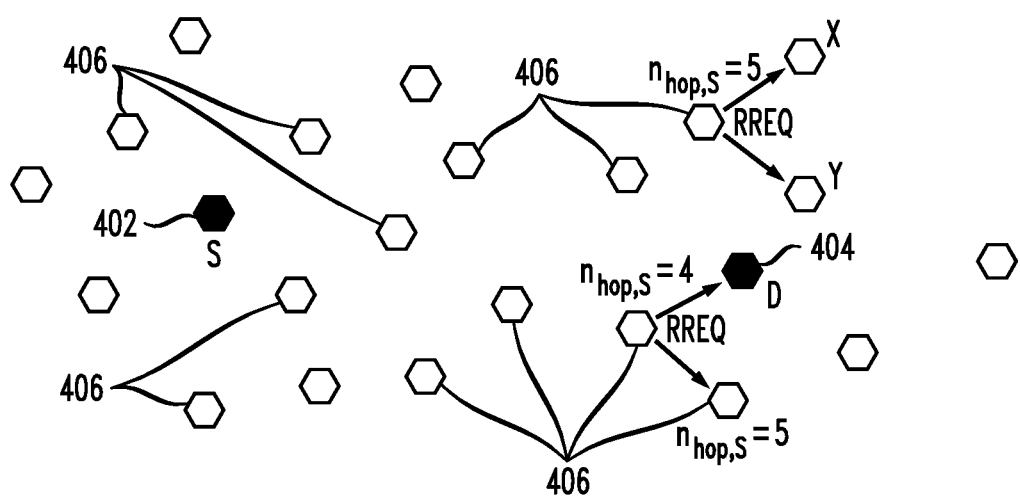
FIG. 4 is a diagram illustrating forward route construction, according to an embodiment of the present invention.

The described procedure is iterated until the destination is reached, as depicted in FIG. 4. FIG. 4 is a diagram illustrating forward route construction, according to an embodiment of the present invention. By way of illustration, FIG. 4 depicts a source node 402 denoted by S, a destination 404 denoted by D, and nodes 406. Nodes that receive the RREQ for the first time and comply with the maximum distance from the source parameter (for example, $n_{hop,S} \leq 5$) rebroadcast the packet. Terminals that are too far (in terms of hop) from S, like X and Y, do not participate in the route construction even if they correctly decode the frame.

At the end of the FRC, the protocol has identified a set of nodes that have received the RREQ frame and are not too far from the source.

Additionally, consider the requirement imposed by $n_{hopmax}$. The aim of this condition is twofold. On one hand, bounding the distance from the source prevents from having extremely long routes that are not likely to offer sufficient warranties in terms of delay and reliability. On the other hand, this strategy contains the overhead introduced by the flooding scheme used for broadcasting route construction frames. Referring to the situation depicted in FIG. 1, consider the nodes on the left of S. Such terminals do not fulfill the converge-casting property (that is, they do not offer any geographic advancement towards the destination) and therefore are not supposed to take part in the routing procedure from S to D. However, due to the lack of location information, they cannot infer this condition and will rebroadcast the RREQ message. The requirement on $n_{hopmax}$ is thus useful to avoid an excessive propagation of unnecessary messages in the network.

Backward Route Construction.

One or more embodiments of the invention also include a backward route construction procedure (as additionally described in connection with FIG. 12 and FIG. 13 below). When node D receives a RREQ packet addressed to it, a backward route construction procedure is initiated. The destination sends out a Route REPly (RREP) frame, as depicted in Table III below, whose fields are set as follows:

$src_{addr}$: S;
$dest_{addr}$: D;
$seq_{id}$: $seq_{id}$ contained in the decoded RREQ;
$n_{hopD}$: 0;
Time: current time.

TABLE III

STRUCTURE OF A RREP PACKET

| $src_{addr}$ | $dest_{addr}$ | $seq_{id}$ | $n_{hopD}$ | Time |
|---|---|---|---|---|

Nodes that decode this frame perform the test on $n_{hopmax}$ and, if the requirement is fulfilled, they check the RT to determine if they have the FRF for the (S,D) pair switched on. If it is fulfilled, they further determine if the corresponding $seq_{id}$ field is equal to the one provided by the RREP packet. If the tests fail, a terminal discards the received frame and gives up the BRC. Otherwise, the $n_{hopD}$ and Time fields of the suitable entry of the RT are updated according to the values in the RREP. Any node that has the $n_{hopD}$ field set for (S,D) in its RT is said to have the backward route flag (BRF) switched on for that couple. Terminals with both FRF and BRF on for a given source-destination combination are said to be active for that pair, with a sequence number equal to the $seq_{id}$ value of the corresponding RT entry.

Figure 5:
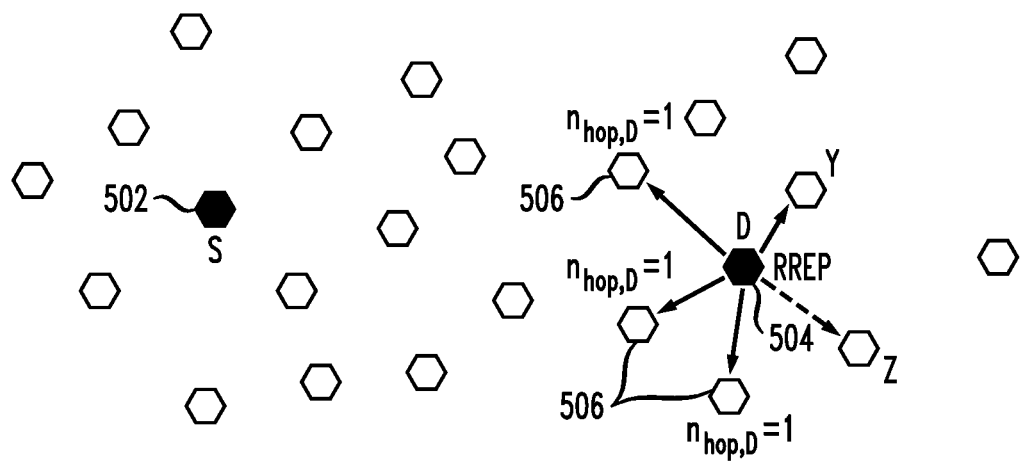
FIG. 5 is a diagram illustrating backward route construction, according to an embodiment of the present invention.

FIG. 5 is a diagram illustrating backward route construction, according to an embodiment of the present invention. By way of illustration, FIG. 5 depicts a source node 502 denoted by S, a destination 504 denoted by D, and nodes 506. The destination broadcasts a RREP packet. Nodes 506 that decode it (continuous line) and have their forward route flag for the S-D communication switched "on," enable the backward route flag as well and update their routing table. Terminals that do not decode the frame (dashed line; for example, Z) or terminals that had not switched on the forward route flag (for example, Y) do not participate in the backward route construction.

Once the register is refreshed, an active node sends out a new RREP packet by copying the received one and by increasing the $n_{hopD}$ field by one. Nodes that receive a RREP packet transmitted by a node different from D, check their RT as described above and, if appropriate, update their register.

Figure 6:
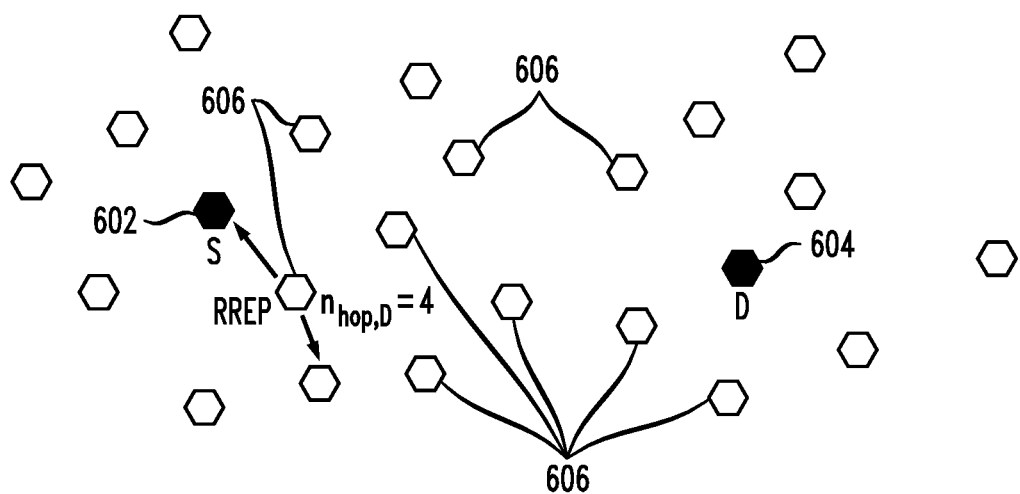
FIG. 6 is a diagram illustrating backward route construction, according to an embodiment of the present invention.

The procedure is then iterated, as depicted in FIG. 6. By way of illustration, FIG. 6 depicts a source node 602 denoted by S, a destination 604 denoted by D, and nodes 606. Nodes that receive the RREP for the first time and comply with the maximum distance from the destination parameter (for example, $n_{hop,D} \leq 5$) rebroadcast the packet. Terminals that decode the packet but had not switched on the forward route flag do not participate.

At the end of the BRC, a tunnel connecting the source and the destination composed by nodes that have received both RREQ and RREP is identified.

Data Forwarding.

Additionally, one or more embodiments of the present invention include a data forwarding procedure (as additionally described in connection with FIG. 14 and FIG. 15 below). Once the route construction procedure has been accomplished (that is, as soon as the source receives the first RREP packet), the data flow from S to D can start. As a static path has not been identified, the next hop has to be chosen at runtime among potential forwarders. Resembling dynamic geographic routing algorithms, TR exploits a fully distributed contention mechanism based on back-off and carrier sensing.

The source initiates the procedure by transmitting a request to send (RTS) packet, as depicted in Table IV, whose fields are set as follows:

$src_{addr}$: S;
$dest_{addr}$: D;
$seq_{id}$: $seq_{id}$ used to initiate the FRC procedure.

TABLE IV

STRUCTURE OF AN RTS PACKET

| $src_{addr}$ | $dest_{addr}$ | $seq_{id}$ |
|---|---|---|

Any active node i for the (S,D) pair with sequence number equal to $seq_{id}$ that decodes the RTS computes a $\gamma_i$ metric and picks a back-off timer of duration $T_i$ which is inversely proportional to $\gamma_i$. Once the back-off has been determined, the terminal starts sensing the aggregate power level $P_i$ perceived on the wireless medium. If within $T_i$ seconds, $P_i$ exceeds a threshold value $\overline{P}$, the node discards the RTS frame and goes back to its activity. On the contrary, if the timer expires and the aggregate power has remained below $\overline{P}$, the terminal replies to the RTS by transmitting a uni-cast acknowledgement packet to the source (that is, a CTS packet as depicted in Table V).

TABLE V

STRUCTURE OF A CTS PACKET

| $src_{addr}$ | $dest_{addr}$ | $seq_{id}$ |
|---|---|---|

At the end of this contention phase, node S can perform a usual uni-cast transmission to the chosen next hop exploiting the underlying MAC layer. The procedure is iterated, routing data towards the destination.

Figure 7:
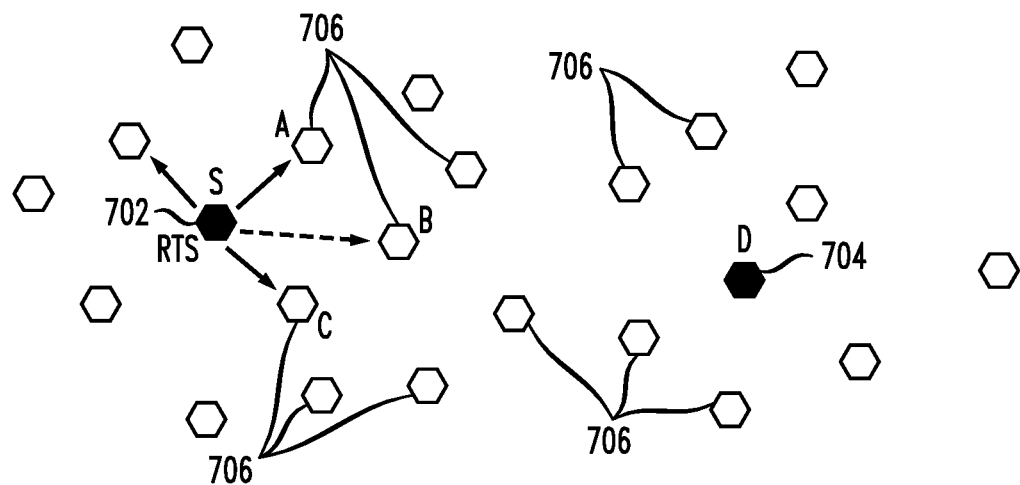
FIG. 7 is a diagram illustrating request to send packet (RTS) transmission, according to an embodiment of the present invention.

FIG. 7 is a diagram illustrating request to send packet (RTS) transmission, according to an embodiment of the present invention. By way of illustration, FIG. 7 depicts a source node 702 denoted by S, a destination 704 denoted by D, and nodes 706. The source sends out an RTS frame asking for a next hop to reach D. Only active nodes 706 can reply to the message. Some of the nodes (for example, B) may not be able to decode the frame due to harsh channel conditions.

Figure 8:
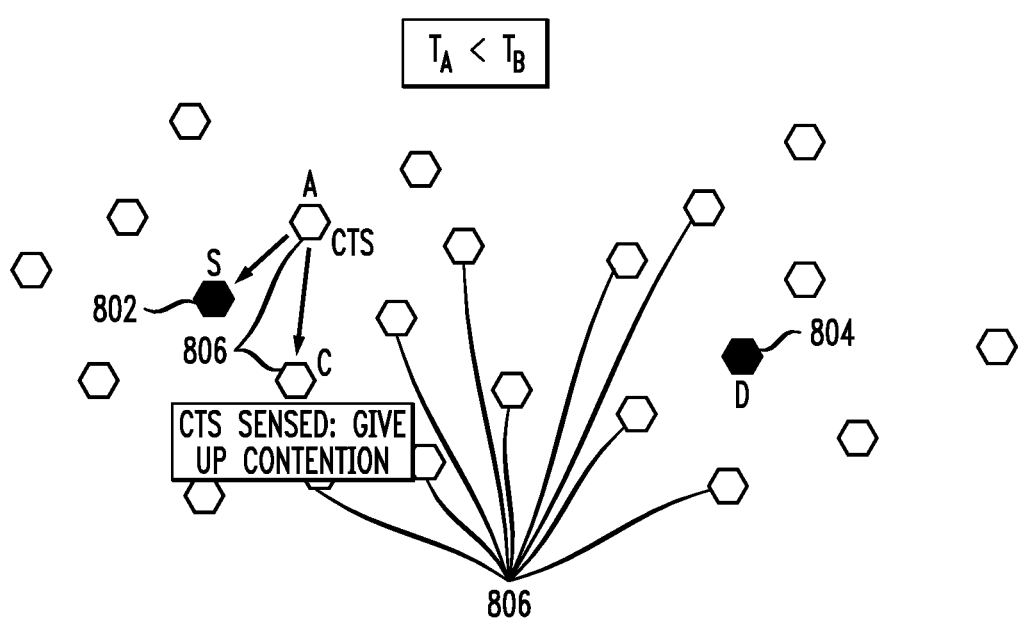
FIG. 8 is a diagram illustrating contention among potential next hops, according to an embodiment of the present invention.

FIG. 8 is a diagram illustrating contention among potential next hops, according to an embodiment of the present invention. By way of illustration, FIG. 8 depicts a source node 802 denoted by S, a destination 804 denoted by D, and nodes 806. Active nodes 806 that decode the RTS, for instance A and B, contend to forward the data packet. Each of them picks a back-off interval according to a given policy (that is, $T_A$ and $T_B$ in FIG. 8) and starts sensing the power level on the medium. The node with the shortest back-off (for instance, node A) accesses the channel first by sending a CTS to S. Other terminals perceive the transmission and give up their attempt. A single relay is thus chosen.

Figure 9:
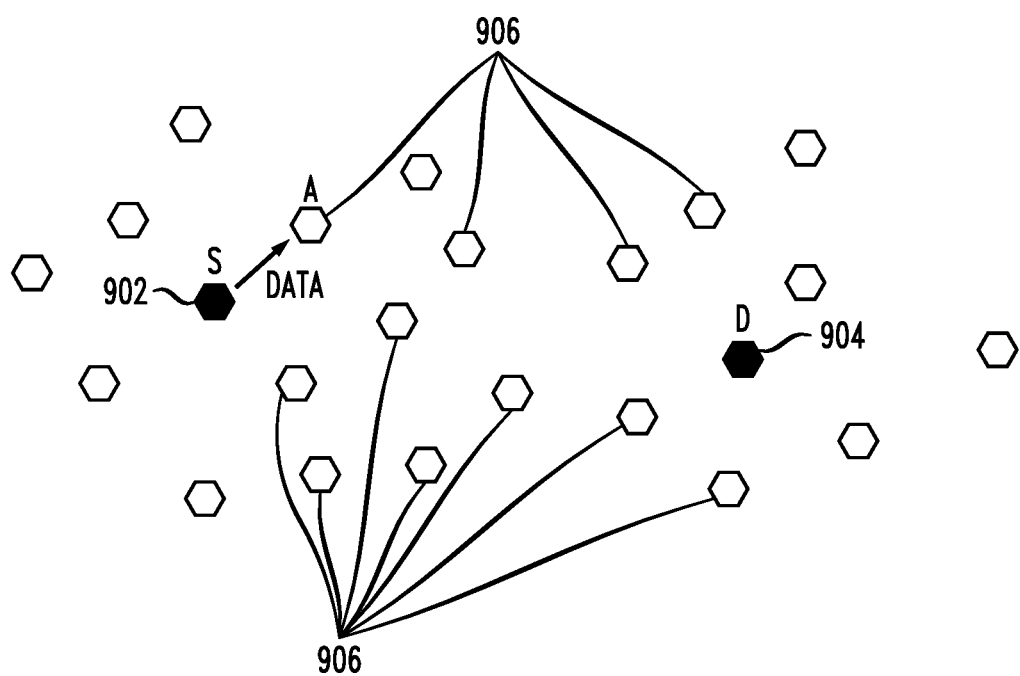
FIG. 9 is a diagram illustrating data forwarding, according to an embodiment of the present invention.

FIG. 9 is a diagram illustrating data forwarding, according to an embodiment of the present invention. By way of illustration, FIG. 9 depicts a source node 902 denoted by S, a destination 904 denoted by D, and nodes 906. Once the next hop is chosen, the source sends out a uni-cast data packet addressed to it, exploiting the underlying medium access strategy.

Consider the γ metric. As described herein, its purpose is twofold. First of all, γ has to guarantee converge-casting, that is, only nodes that offer an actual advancement towards D should be considered as forwarders. In dynamic geographic routing schemes, this task is easily accomplished by including in the RTS the position of the sender of the frame. Potential relays can therefore compute the geographic gain they offer by comparing their distance to the destination (whose location is assumed to be known) with the RTS-sender destination distance. The closer a terminal to D, the higher γ is.

However, converge-casting can also be achieved without geographic knowledge. To this aim, TR exploits information gathered during the FRC and BRC phases concerning the distance in terms of hops from S and D. For instance, advancement towards D is guaranteed and loops are avoided as soon as γ is inversely proportional to $n_{hop,S} + n_{hop,D}$.

On the other hand, γ can take into account other factors (such as, for example, channel conditions or remaining battery energy) in order to improve the reliability of routing. These aspects can be included in one or more embodiments of the invention as soon as they are available at the network layer (that is, according to the capabilities offered by the node) and if they are meaningful for the considered scenario (for example, battery energy may not be a major issue in ad hoc networks). As such, the techniques described herein include tunneling that is independent of the way γ is actually implemented, provided converge-casting is guaranteed.

Route Recovery.

Further, one or more embodiments of the invention include a route recovery procedure. As described herein, a routing protocol advantageously should provide a strategy to deal with route failures that occur whenever a given path (either static or dynamic) is no longer able to forward data to the destination. Although the dynamic approach followed by TR is meant to strongly reduce the frequency of these events, route failures may happen either because the destination has moved out of range for any active terminal or because of a hole in the tunnel induced by node unavailabilities. As such, one or more embodiments of the invention deal with the first condition by suitably tuning the $T_{max}$ parameter, while the second clause may be typical of low density scenarios and affects any type of routing scheme. Tunnel routing, as described herein, does not require a specific route recovery procedure to be implemented, but is instead compatible with different possible solutions. For example, a node that experiences a critical condition (that is, a node that is not able to find a next hop to further forward data towards D) could be in charge of finding a new set of active nodes (that is, starting a FRC procedure to track D) or it could simply broadcast a message meant to inform all the surrounding terminals (and eventually S) that the route is no longer value, leaving the decision on how to proceed up to the source.

Figure 10:
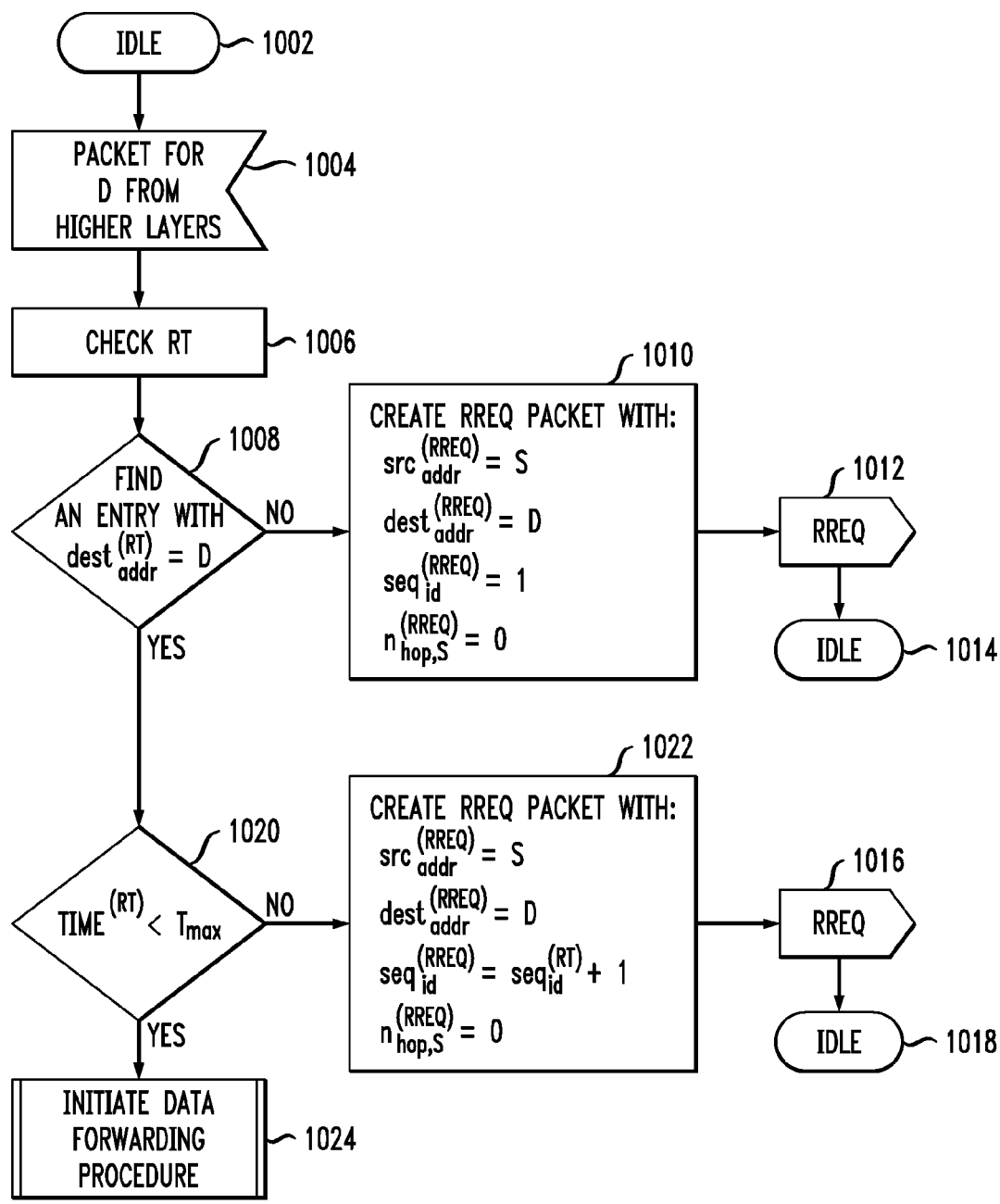
FIG. 10 is a diagram illustrating forward route construction initiation at the source, according to an embodiment of the present invention.

FIG. 10 is a diagram illustrating forward route construction initiation at the source, according to an embodiment of the present invention. By way of illustration, FIG. 10 depicts the following steps. Step 1002 includes being idle. Step 1004 includes receiving a packet for D from higher layers. Step 1006 includes checking RT. Step 1008 includes finding an entry with $dest_{addr}^{(RT)} = D$. If one cannot find such an entry, then one proceeds to step 1010 which includes creating a RREQ packet with $src_{addr}^{(RREQ)} = S$, $dest_{addr}^{(RREQ)} = D$, $seq_{id}^{(RREQ)} = 1$, $n_{hop,S}^{(RREQ)} = 0$. Step 1012 includes transmitting the RREQ and step 1014 includes being idle.

If one finds an entry in the RT with $dest_{addr}^{(RT)} = D$, then one proceeds to step 1020, which includes determining if the time field for this entry (time$^{(RT)}$) fulfills the condition time$^{(RT)} < T_{max}$. If time$^{(RT)}$ is greater than $T_{max}$, then one proceeds to step 1022, which includes creating a RREQ packet with $src_{addr}^{(RREQ)} = S$, $dest_{addr}^{(RREQ)} = D$, $seq_{id}^{(RREQ)} = seq_{id}^{(RT)} + 1$, $n_{hop,S}^{(RREQ)} = 0$. Step 1016 includes transmitting the RREQ and step 1018 includes being idle. If time$^{(RT)}$ is less than $T_{max}$, then one proceeds to step 1024, which includes initiating data forwarding procedure.

Figure 11:
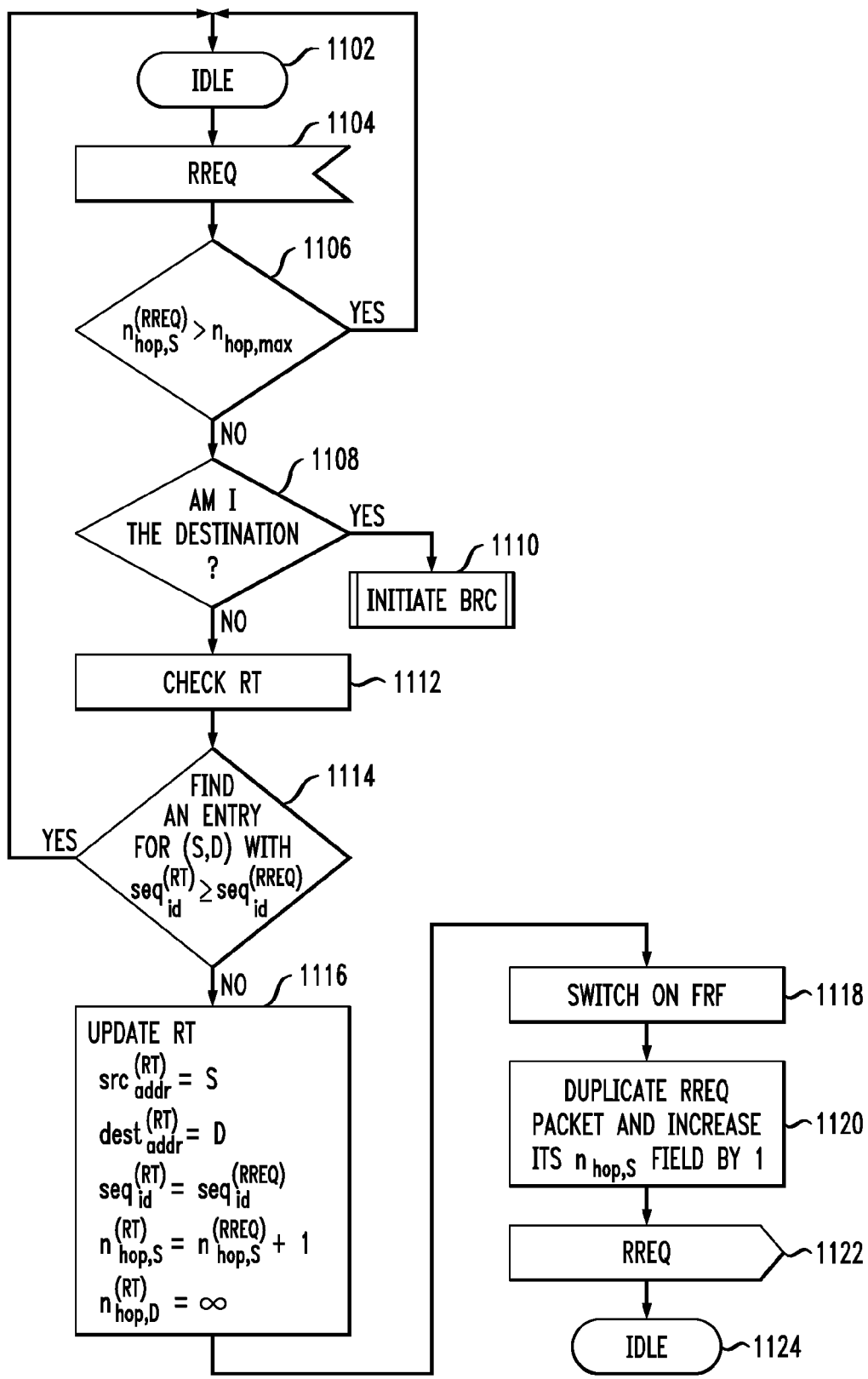
FIG. 11 is a diagram illustrating forward route construction at an intermediate node or at the destination, according to an embodiment of the present invention.

FIG. 11 is a diagram illustrating forward route construction at an intermediate node or at the destination, according to an embodiment of the present invention. By way of illustration, FIG. 11 depicts the following steps. Step 1102 includes being idle. Step 1104 includes receiving a RREQ packet. Step 1106 includes determining if the $n_{hop,S}$ field in the RREQ packet ($n_{hop,S}^{(RREQ)}$) satisfies the relation $n_{hop,S}^{(RREQ)} > n_{hop,max}$. If the determination is "yes," then one returns to step 1102. If the determination is "no," then one proceeds to step 1108, which includes asking "Am I the destination"? If the answer is yes, then proceed to step 1110 and initiate BRC. If the answer is no, proceed to step 1112 and check RT. Step 1114 includes finding an entry in the RT for the (S,D) pair with $seq_{id}^{(RT)} \geq seq_{id}^{(RREQ)}$. If $seq_{id}^{(RT)} \geq seq_{id}^{(RREQ)}$, then return to step 1102. If $seq_{id}^{(RT)} \leq seq_{id}^{(RREQ)}$ or if no entry for the (S,D) pair is found in the RT, proceed to step 1116, which includes creating or updating an entry in the RT with fields: $src_{addr}^{(RT)} = S$, $dest_{addr}^{(RT)} = D$, $seq_{id}^{(RT)} = seq_{id}^{(RREQ)}$, $n_{hop,S}^{(RT)} = n_{hop,S}^{(RREQ)} + 1$, $n_{hop,S}^{(RT)} = \infty$. Step 1118 includes switching on FRF. Step 1120 includes duplicating RREQ packet and increasing its $n_{hop,S}$ field by one. Step 1122 includes transmitting the RREQ, and step 1124 includes being idle.

Figure 12:
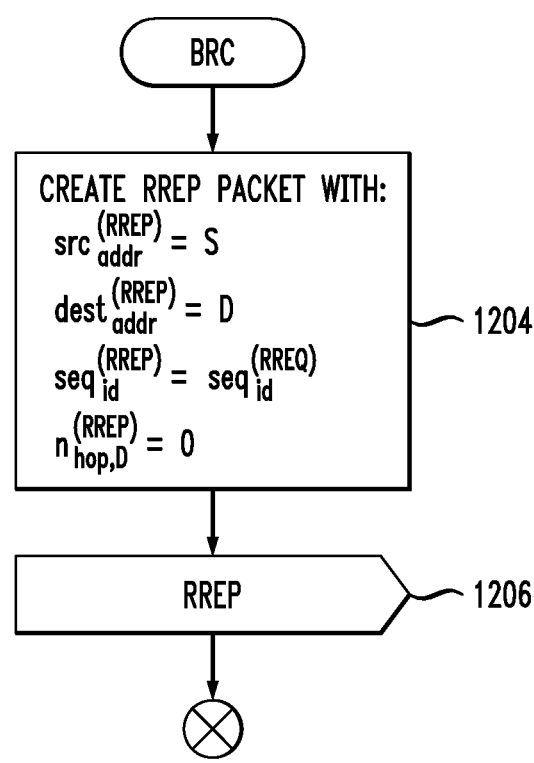
FIG. 12 is a diagram illustrating backward route construction initiation at the destination, according to an embodiment of the present invention.

FIG. 12 is a diagram illustrating backward route construction initiation at the destination, according to an embodiment of the present invention. By way of illustration, FIG. 12 depicts the following steps. Step 1204 includes creating a RREP packet with $src_{addr}^{(RREP)} = S$, $dest_{addr}^{(RREP)} = D$, $seq_{id}^{(RREP)} = seq_{id}^{(RREQ)}$, $n_{hop,D}^{(RREP)} = 0$. Step 1206 includes transmitting the RREP.

Figure 13:
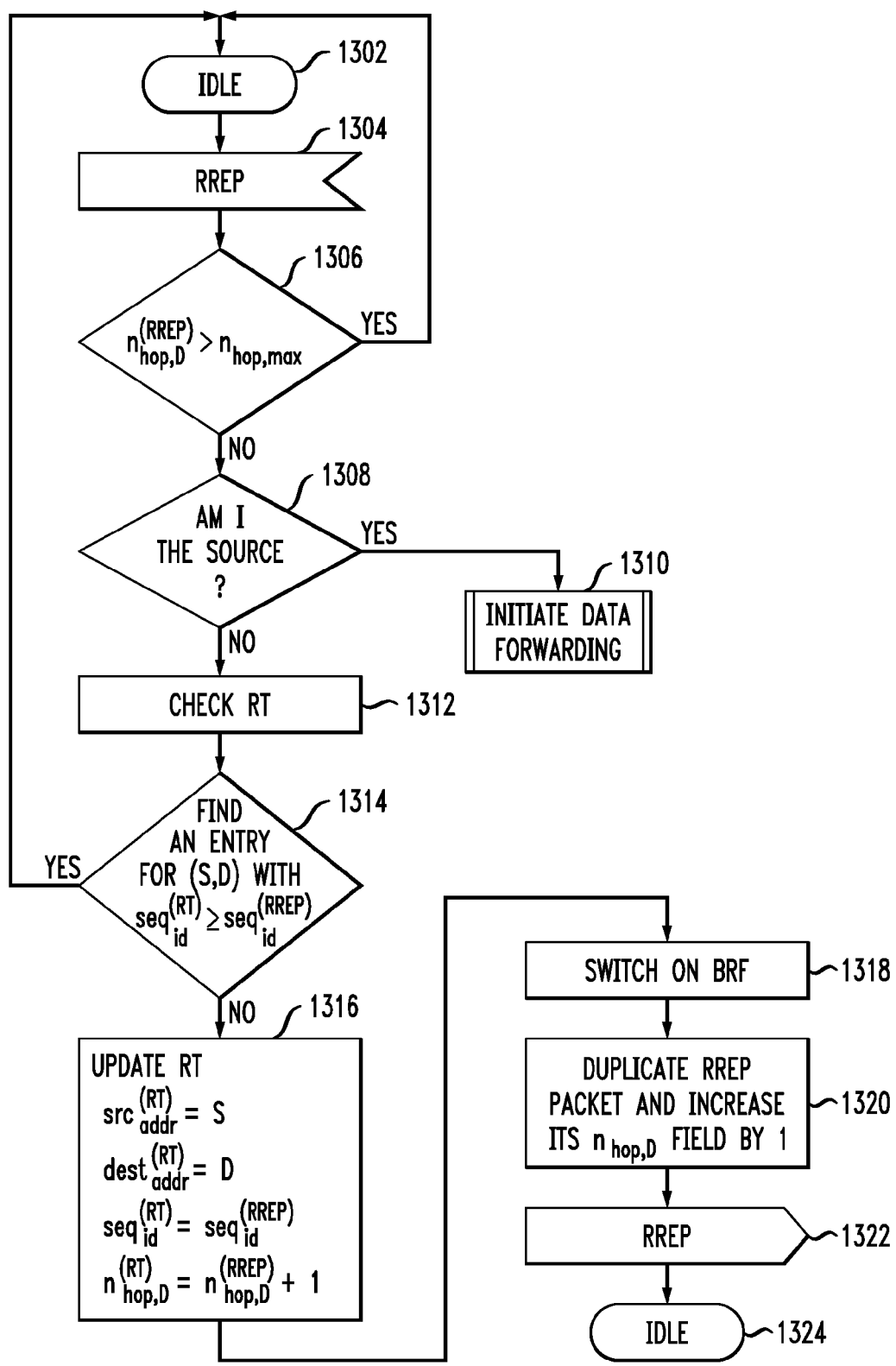
FIG. 13 is a diagram illustrating backward route construction at an intermediate node or at the source, according to an embodiment of the present invention.

FIG. 13 is a diagram illustrating backward route construction at an intermediate node or at the source, according to an embodiment of the present invention. By way of illustration, FIG. 13 depicts the following steps. Step 1302 includes being idle. Step 1304 includes receiving a RREP packet. Step 1306 includes determining if the $n_{hop,D}$ field in the RREP packet satisfies the relation $n_{hop,D}^{(RREP)} > n_{hop,max}$. If the answer is yes, then return to step state idle. If the answer is no, then proceed to step 1308, which includes asking "Am I the source"? If the answer is yes, proceed to step 1310 which includes initiating data forwarding. If the answer is no, proceed to step 1312, which includes checking RT.

Step 1314 includes finding an entry in the RT for the (S,D) pair with $seq_{id}^{(RT)} \geq seq_{id}^{(RREP)}$. If such an entry is found, return to idle mode. If no such entry is found, proceed to step 1316, which includes creating or updating an entry in the RT with fields: $src_{addr}^{(RT)} = S$, $dest_{addr}^{(RT)} = D$, $seq_{id}^{(RT)} = seq_{id}^{(RREP)}$, $n_{hop,D}^{(RT)} = n_{hop,D}^{(RREQ)} + 1$. Step 1318 includes switching on BRF. Step 1320 includes duplicating the RREP packet and increasing its $n_{hop,D}$ field by one. Step 1322 includes transmitting the RREP packet and step 1324 includes going idle.

Figure 14:
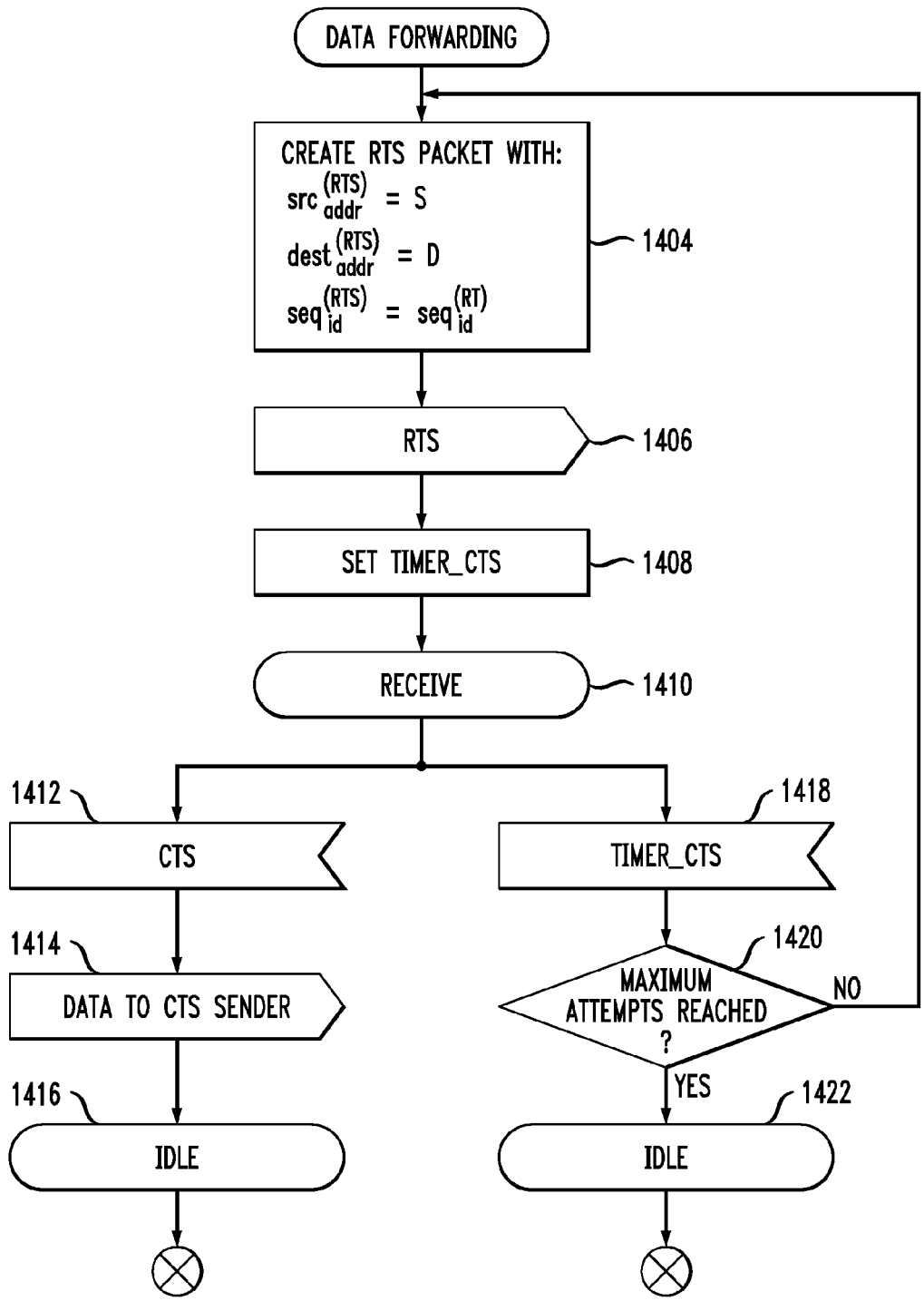
FIG. 14 is a diagram illustrating data forwarding procedure initiation at the source, according to an embodiment of the present invention.

FIG. 14 is a diagram illustrating data forwarding procedure initiation at the source, according to an embodiment of the present invention. By way of illustration, FIG. 14 depicts the following steps. Step 1404 includes creating an RTS packet with $src_{addr}^{(RTS)}=S$, $dest_{addr}^{(RTS)}=D$, $seq_{id}^{(RTS)}=seq_{id}^{(RT)}$. Step 1406 includes transmitting the RTS packet. Step 1408 includes setting a timer (timer CTS) to wait for a CTS packet in reply. Step 1410 includes going to state receive, waiting for a CTS packet. Specifically, step 1412 includes receiving a CTS packet, step 1414 includes sending data to the CTS sender and step 1416 includes going idle. On the other hand, step 1418 includes the expiration of a time interval of length timer CTS without having received a CTS packet, and step 1420 includes determining if the maximum number of transmission attempts for the current data packet have been reached. If the answer is no, return to step 1404. If the answer is yes, proceed to step 1422 which includes being idle.

Figure 15:
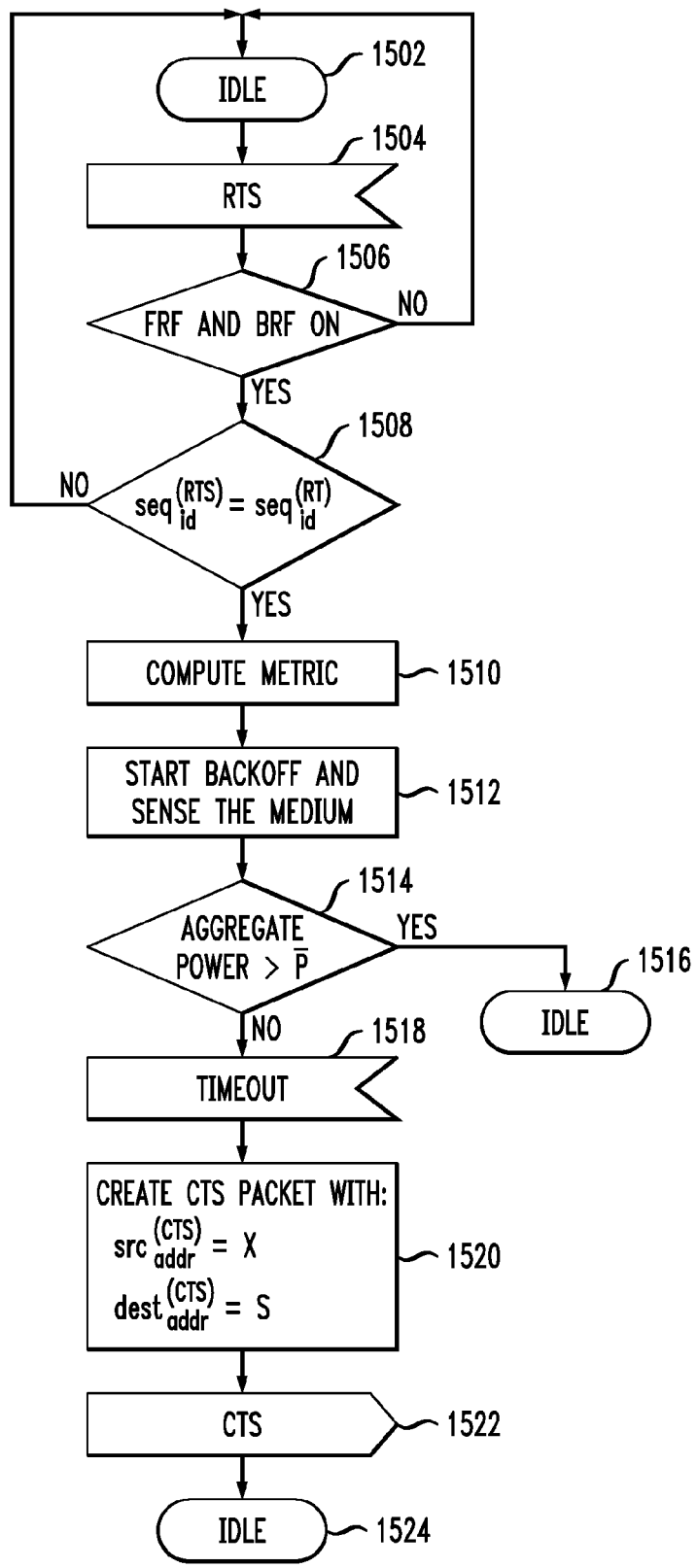
FIG. 15 is a diagram illustrating data forwarding procedure at an intermediate node X, according to an embodiment of the present invention.

FIG. 15 is a diagram illustrating data forwarding procedure at an intermediate node X, according to an embodiment of the present invention. By way of illustration, FIG. 15 depicts the following steps. Step 1502 includes being idle. Step 1504 includes receiving an RTS packet. Step 1506 includes determining if FRF and BRF are on for the (S,D) pair, where S and D are specified in the src_addr and dest_addr fields of the received RTS. If the answer is no, then return to step 1502. If the answer is yes, then proceed to step 1508, which includes determining if the seq_id field in the RTS equals the field seq_id for the (S,D) pair in the RT ($seq_{id}^{(RTS)}=seq_{id}^{(RT)}$). If the answer is no, then return to step 1502. If the answer is yes, then proceed to step 1510, which includes computing a metric γ as described herein in the "Data Forwarding" section.

Step 1512 includes starting a backoff procedure whose length is inversely proportional to γ and sensing the medium. Step 1514 includes determining if aggregate power perceived on the medium during the backoff goes over a threshold, $\overline{P}$. If the answer is yes, then proceed to step 1516 which includes being idle. If the backoff interval expires (timeout 1518) and the power sensed on the medium has stayed below $\overline{P}$, proceed to step 1520. Step 1520 includes transmitting the CTS packet with $src_{addr}^{(CTS)}=X$, $dest_{addr}^{(CTS)}=S$. Step 1522 includes obtaining CTS and step 1524 includes being idle.

Figure 16:
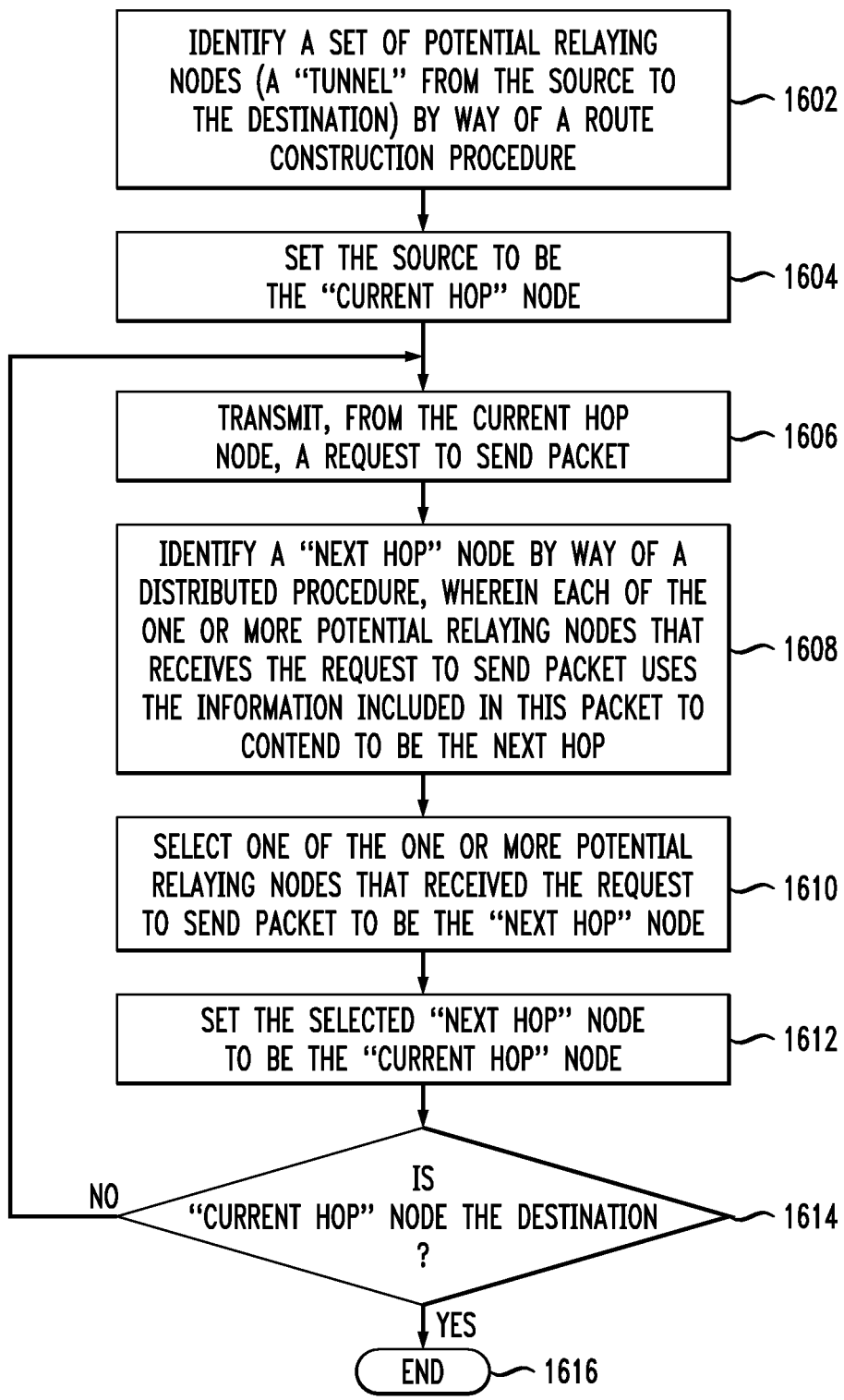
FIG. 16 is a flow diagram illustrating techniques for routing data, according to an embodiment of the present invention.

FIG. 16 is a flow diagram illustrating techniques for routing data, according to an embodiment of the present invention. Step 1602 includes identifying a set of potential relaying nodes (a "tunnel" from the source to the destination) by way of a route construction procedure. Step 1604 includes setting the source to be the "current hop" node. Step 1606 includes transmitting, from the current hop node, a request to send packet. Step 1608 includes identifying a "next hop" node by way of a distributed procedure, wherein each of the one or more potential relaying nodes that receives the request to send packet uses the information included in this packet to contend to be the next hop.

Also, step 1610 includes selecting one of the one or more potential relaying nodes that received the request to send packet to be the "next hop" node. Step 1612 includes setting the selected "next hop" node to be the "current hop" node. Additionally, step 1614 includes determining if the "current hop" node is the destination. If the answer to the question in step 1614 is yes, then proceed to the end of the process in step 1616. If the answer to the question in step 1614 is no, return to step 1606. In one or more embodiments of the invention, one can repeat the above-noted steps until the destination eventually receives the data addressed thereto. The techniques described herein can also include a route recovery procedure (as detailed herein).

As detailed herein, one or more embodiments of the present invention can include identifying one or more potential relaying nodes, sending, from a node that wants to forward data, a request to send packet to each of the one or more potential relaying nodes, wherein each of the one or more potential relaying nodes uses the request to contend to be a relaying node, and selecting one of the one or more potential relaying nodes to be the relaying node to route the data. One can also use information gathered during route construction to guarantee converge-casting, as well as generate one or more forward route constructions, wherein generating forward route constructions include a source node broadcasting a route request (RREQ) to nodes that decode the RREQ, switch a forward route flag and update a routing table.

One or more embodiments of the invention can also include generating one or more backward route constructions, wherein generating backward route constructions include, for example, a destination node receiving a route request (RREQ), the destination node broadcasting a route reply, and one or more nodes decoding the route reply, switching on a forward route flag and updating a routing table.

Figure 17:
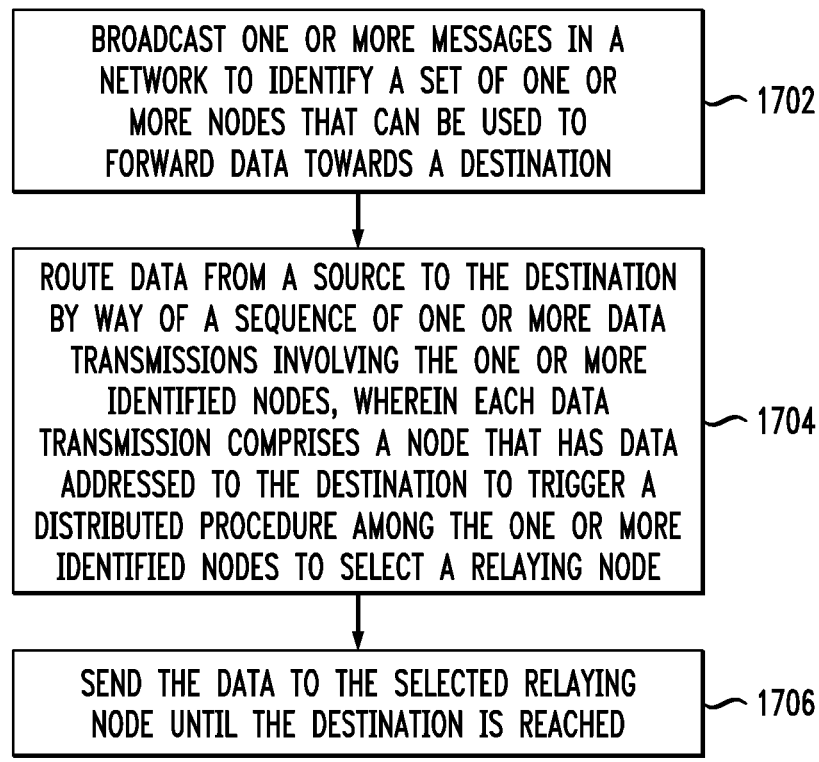
FIG. 17 is a flow diagram illustrating techniques for routing data from a source to a destination in a wireless network, according to an embodiment of the present invention.

FIG. 17 is a flow diagram illustrating techniques for routing data from a source to a destination in a wireless network, according to an embodiment of the present invention. Step 1702 includes broadcasting one or more messages in a network to identify a set of one or more nodes that can be used to forward data towards a destination (also referred to herein as a "tunnel"). Step 1704 includes routing data from a source to the destination by way of a sequence of one or more data transmissions involving the one or more identified nodes, wherein each data transmission comprises a node that has data addressed to the destination to trigger a distributed procedure among the one or more identified nodes to select a relaying node. Using the request to contend to be a relaying node can include computing a suitable metric and performing one or more backoff procedure. Step 1706 includes sending the data to the selected relaying node until the destination is reached.

The techniques depicted in FIG. 17 can also include, for example, generating forward route construction procedures. Generating forward route construction procedures can include a source node broadcasting a route request (RREQ) packet, one or more nodes that decode the packet comparing information contained in the RREQ with information contained in a routing table of each of the nodes, determining if the nodes are suitable to be part of the nodes that can be used to forward data towards the destination (that is, the tunnel) according to a given criterion, and if the nodes are suitable to be part of the nodes that can be used to forward data towards the destination, switching on a forward route flag, updating a the routing table of each of the nodes and re-broadcasting an updated version of the RREQ packet.

Further, the techniques depicted in FIG. 17 can include generating backward route construction procedures. Generating backward route constructions can include a destination node broadcasting a route reply (RREP) packet, one or more nodes decoding the RREP packet comparing information contained in the RREP packet with information contained in a routing table of each of the nodes, determining if the nodes are suitable to be part of the nodes that can be used to forward data towards the destination (that is, the tunnel) according to a given criterion, and if the nodes are suitable to be part of the nodes that can be used to forward data towards the destination, switching on a backward route flag, updating the routing table of each of the nodes and re-broadcasting an updated version of the RREP packet.

One or more embodiments of the invention can also include using information gathered during forward route construction and backward route construction to guarantee converge-casting. Additionally, the techniques depicted in FIG.

17 can also include generating a data forwarding procedure. Generating a data forwarding procedure can include, for example, a source node receiving a route reply (RREP) packet from a destination to which it is trying to connect, setting the source to be a current hop, transmitting, from the current hop node a request to send packet, identifying a next hop node by way of a distributed procedure, wherein each of the one or more nodes that receives the packet and that can be used to forward data towards a destination uses information contained in the packet to contend to be the next hop node, selecting one of the potential next hop nodes to be the next hop, sending data meant for the destination from the current hop to the next hop, setting the selected next hop to be the current hop, and repeating the steps until the destination is reached. Using the packet to contend to be the next hop node can include computing a suitable metric and performing a backoff procedure.

One or more embodiments of the invention can also include generating a route recovery procedure. A route recovery procedure can include, for example, finding a new set of active nodes to remedy a condition wherein a node is not able to find a next hop to further forward data towards a destination node. Also, a route recovery procedure can include, for example, broadcasting a message to inform one or more surrounding nodes that a route is no longer value, and enabling a source node to decide how to proceed.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

As described herein, one or more embodiments of the present invention can be implemented in a wireless network. A wireless network can include, for example, multiple entities (such as, for example, general purpose computers, sensor nodes, personal digital assistants (PDAs), etc.). Such entities have a radio transceiver to communicate among each other by way of wireless communications. As such, one or more embodiments of the invention allow multiple machines efficiently communicate with each other via the wireless medium.

Figure 18:
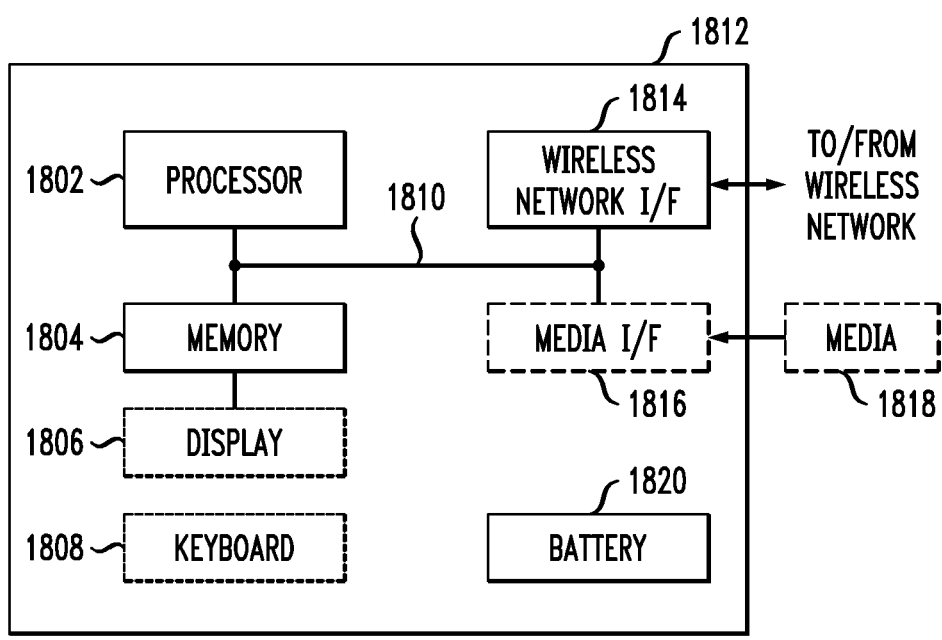
FIG. 18 depicts a computer system that may be useful in implementing one or more aspects and/or elements of the present invention.

At present, it is believed that the one or more implementations can make substantial use of software running on, for example, a general-purpose computer or workstation, as well as a device that is a part of a wireless network (such as, for example, general purpose computers, sensor nodes, PDAs, etc.). With reference to FIG. 18, such an implementation might employ, for example, a processor 1802, a memory 1804, and an input and/or output interface formed, for example, by a display 1806 and a keyboard 1808. An implementation such as depicted in FIG. 18 can also include a battery 1820. Also, the term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit. The processor 1802, memory 1804, and input and/or output interface such as display 1806 and keyboard 1808 can be interconnected, for example, via bus 1810 as part of a data processing unit 1812. Suitable interconnections, for example via bus 1810, can also be provided to a wireless network interface 1814, such as, for example, a radio transceiver, which can be provided to interface with a wireless network, and optionally to a media interface 1816, such as a diskette or CD-ROM drive, which can be provided to interface with media 1818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1818) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 1804), magnetic tape, a removable computer diskette (for example, media 1818), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 1802 coupled directly or indirectly to memory elements 1804 through a system bus 1810. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 1808, displays 1806, pointing devices, and the like) can be coupled to the system either directly (such as via bus 1810) or through intervening I/O controllers (omitted for clarity).

Network adapters such as wireless network interface 1814 may also be coupled to the system to enable the data processing system to become coupled to other data processing systems or remote printers or storage devices through intervening private or public networks.

Additionally, one or more embodiments of the invention can be implemented in the form of software that is loaded onto the memory of a device and then executed, as described above. The device can be, for example, a laptop, a PDA, and/or a sensor node. A device that implements one or more embodiments of the present invention preferably has a radio transceiver (for example, laptops usually have an IEEE 802.11x card while sensor nodes typically have an IEEE 802.15.4 radio).

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, providing robustness against impairments that typically affect static routing without requiring additional efforts in terms of location management.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for routing data from a source to a destination in a wireless network, comprising the steps of:
   broadcasting one or more messages in a network to identify a set of two or more nodes that can be used to forward data from a given node towards a destination, wherein each of said nodes in said set of two or more nodes are neighboring nodes of said given node;
   routing data from a source to the destination by way of a sequence of one or more data transmissions involving the two or more identified nodes, wherein each data transmission comprises a node that has data addressed to the destination to trigger a distributed procedure among the two or more identified nodes, wherein said two or more identified nodes collaborate to select a relaying node;
   sending the data to the selected relaying node until the destination is reached; and
   generating a data forwarding procedure, wherein generating the data forwarding procedure comprises:
      a source node receiving a route reply (RREP) packet from a destination to which it is trying to connect;
      setting the source node to be a current hop;
      transmitting, from the current hop node a request to send packet;
      identifying a next hop node by way of the distributed procedure, wherein each of one or more nodes that receives the packet and that can be used to forward the data towards a destination uses information contained in the packet to contend to be the next hop node;
      selecting one of the one or more potential next hop nodes to be the next hop;
      sending data meant for the destination from the current hop to the next hop;
      setting the selected next hop to be the current hop; and
      repeating steps of said data forwarding procedure until the destination is reached.

2. The method of claim 1, further comprising generating one or more forward route construction procedures.

3. The method of claim 2, wherein generating one or more forward route construction procedures comprises:
   the source node broadcasting a route request (RREQ) packet;
   one or more nodes that decode the RREQ packet comparing information contained in the RREQ with information contained in a routing table of each of the one or more nodes;
   determining if the one or more nodes are suitable to be part of the two or more nodes that can be used to forward data towards the destination according to a given criterion; and
   if the one or more nodes are suitable to be part of the two or more nodes that can be used to forward data towards the destination, switching on a forward route flag, updating the routing table of each of the one or more nodes and re-broadcasting an updated version of the RREQ packet.

4. The method of claim 1, further comprising generating one or more backward route construction procedures.

5. The method of claim 4, wherein generating one or more backward route constructions comprises:
   a destination node broadcasting a route reply (RREP) packet;
   one or more nodes decoding the RREP packet comparing information contained in the RREP packet with information contained in a routing table of each of the one or more nodes;
   determining if the one or more nodes are suitable to be part of the two or more nodes that can be used to forward the data towards the destination according to a given criterion; and
   if the one or more nodes are suitable to be part of the two or more nodes that can be used to forward the data towards the destination, switching on a backward route flag, updating the routing table of each of the one or more nodes and re-broadcasting an updated version of the RREP packet.

6. The method of claim 1, further comprising using information gathered during forward route construction and backward route construction to guarantee converge-casting.

7. The method of claim 1, wherein using the request to send packet to contend to be the next hop node comprises computing a suitable metric and performing a backoff procedure.

8. The method of claim 1, further comprising generating a route recovery procedure.

9. The method of claim 8, wherein generating a route recovery procedure comprises finding a new set of one or more active nodes to remedy a condition wherein a node is not able to find the next hop to further forward the data towards a destination node.

10. The method of claim 8, wherein generating a route recovery procedure comprises broadcasting a message to inform one or more surrounding nodes that a route is no longer value, and enabling the source node to decide how to proceed.

11. A computer program product comprising a tangible computer readable recordable storage medium having computer readable program code for routing data from a source to a destination in a wireless network, said computer program product including:
   computer readable program code for broadcasting one or more messages in a network to identify a set of two or more nodes that can be used to forward data from a given node towards a destination, wherein each of said nodes in said set of two or more nodes are neighboring nodes of said given node;
   computer readable program code for routing data from a source to the destination by way of a sequence of one or more data transmissions involving the two or more identified nodes, wherein each data transmission comprises a node that has data addressed to the destination to trigger a distributed procedure among the two or more identified nodes, wherein said two or more identified nodes collaborate to select a relaying node;

computer readable program code for sending the data to the selected relaying node until the destination is reached; and computer readable program code for generating a data forwarding procedure, wherein generating the data forwarding procedure comprises:
- a source node receiving a route reply (RREP) packet from a destination to which it is trying to connect;
- setting the source node to be a current hop;
- transmitting, from the current hop node a request to send packet;
- identifying a next hop node by way of the distributed procedure, wherein each of one or more nodes that receives the packet and that can be used to forward the data towards a destination uses information contained in the packet to contend to be the next hop node;
- selecting one of the one or more potential next hop nodes to be the next hop;
- sending data meant for the destination from the current hop to the next hop;
- setting the selected next hop to be the current hop; and
- repeating steps of said data forwarding procedure until the destination is reached.

12. The computer program product of claim 11, further comprising computer readable program code for generating one or more forward route construction procedures.

13. The computer program product of claim 11, further comprising computer readable program code for generating one or more backward route construction procedures.

14. The computer program product of claim 11, further comprising computer readable program code for using information gathered during forward route construction and backward route construction to guarantee converge-casting.

15. The computer program product of claim 11, further comprising computer readable program code for generating a route recovery procedure.

16. An apparatus for routing data from a source to a destination in a wireless network, comprising:
a memory; and
at least one processor coupled to said memory and operative to:
- broadcast one or more messages in a network to identify a set of two or more nodes that can be used to forward data from a given node towards a destination, wherein each of said nodes in said set of two or more nodes are neighboring nodes of said given node;
- route data from a source to the destination by way of a sequence of one or more data transmissions involving the two or more identified nodes, wherein each data transmission comprises a node that has data addressed to the destination to trigger a distributed procedure among the two or more identified nodes, wherein said two or more identified nodes collaborate to select a relaying node;
- send the data to the selected relaying node until the destination is reached; and
- generate a data forwarding procedure, wherein generating the data forwarding procedure comprises:
  - a source node receiving a route reply (RREP) packet from a destination to which it is trying to connect;
  - setting the source node to be a current hop;
  - transmitting, from the current hop node a request to send packet;
  - identifying a next hop node by way of the distributed procedure, wherein each of one or more nodes that receives the packet and that can be used to forward the data towards a destination uses information contained in the packet to contend to be the next hop node;
  - selecting one of the one or more potential next hop nodes to be the next hop;
  - sending data meant for the destination from the current hop to the next hop;
  - setting the selected next hop to be the current hop; and
  - repeating steps of said data forwarding procedure until the destination is reached.

17. The apparatus of claim 16, wherein the at least one processor coupled to said memory is further operative to generate one or more forward route construction procedures.

18. The apparatus of claim 16, wherein the at least one processor coupled to said memory is further operative to generate one or more backward route construction procedures.

19. The apparatus of claim 16, wherein the at least one processor coupled to said memory is further operative to use information gathered during forward route construction and backward route construction to guarantee converge-casting.

20. The apparatus of claim 16, wherein the at least one processor coupled to said memory is further operative to generate a route recovery procedure.

21. An apparatus for routing data from a source to a destination in a wireless network, said apparatus comprising:
- means for broadcasting one or more messages in a network to identify a set of two or more nodes that can be used to forward data from a given node towards a destination, wherein each of said nodes in said set of two or more nodes are neighboring nodes of said given node;
- means for routing data from a source to the destination by way of a sequence of one or more data transmissions involving the two or more identified nodes, wherein each data transmission comprises a node that has data addressed to the destination to trigger a distributed procedure among the two or more identified nodes, wherein said two or more identified nodes collaborate to select a relaying node;
- means for sending the data to the selected relaying node until the destination is reached; and
- means for generating a data forwarding procedure, wherein generating the data forwarding procedure comprises:
  - a source node receiving a route reply (RREP) packet from a destination to which it is trying to connect;
  - setting the source node to be a current hop;
  - transmitting, from the current hop node a request to send packet;
  - identifying a next hop node by way of the distributed procedure, wherein each of one or more nodes that receives the packet and that can be used to forward the data towards a destination uses information contained in the packet to contend to be the next hop node;
  - selecting one of the one or more potential next hop nodes to be the next hop;
  - sending data meant for the destination from the current hop to the next hop;
  - setting the selected next hop to be the current hop; and
  - repeating steps of said data forwarding procedure until the destination is reached.

* * * * *